(12) United States Patent
Tsai et al.

(10) Patent No.: US 10,713,195 B2
(45) Date of Patent: Jul. 14, 2020

(54) INTERRUPTS BETWEEN VIRTUAL MACHINES

(71) Applicant: Intel Corporation, Santa Clara, CA (US)

(72) Inventors: Jr-Shian Tsai, Portland, OR (US); Ravi L Sahita, Beaverton, OR (US); Mesut A Ergin, Portland, OR (US); Rajesh M Sankaran, Portland, OR (US); Gilbert Neiger, Portland, OR (US); Jun Nakajima, San Ramon, CA (US); Edwin Verplanke, Chandler, AZ (US); Barry E Huntley, Hillsboro, OR (US); Tsung-Yuan C Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 14/997,478

(22) Filed: Jan. 15, 2016

(65) Prior Publication Data

US 2017/0206177 A1    Jul. 20, 2017

(51) Int. Cl.
  *G06F 13/24* (2006.01)
  *G06F 9/455* (2018.01)
(52) U.S. Cl.
  CPC .......... *G06F 13/24* (2013.01); *G06F 9/45558* (2013.01); *G06F 2009/45575* (2013.01); *G06F 2009/45579* (2013.01)
(58) Field of Classification Search
  CPC ............... G06F 13/24; G06F 9/45558; G06F 2009/45575; G06F 2009/45579
  See application file for complete search history.

(56) References Cited

U.S. PATENT DOCUMENTS

| | | | |
|---|---|---|---|
| 2009/0300414 A1* | 12/2009 | Huang | G06F 11/2097 714/11 |
| 2010/0030898 A1* | 2/2010 | Imai | H04L 12/4641 709/227 |
| 2011/0219374 A1 | 9/2011 | Mann | |
| 2014/0007098 A1* | 1/2014 | Stillwell, Jr. | G06F 9/30003 718/1 |
| 2014/0052932 A1* | 2/2014 | Eidus | G06F 12/0891 711/144 |

(Continued)

OTHER PUBLICATIONS

Tu, Cheng-Chun et al. "A Comprehensive Implementation and Evaluation of Direct Interrupt Delivery", Mar. 14-15, 2015.*

(Continued)

*Primary Examiner* — Henry Tsai
*Assistant Examiner* — John B Roche
(74) *Attorney, Agent, or Firm* — Nicholson De Vos Webster & Elliott LLP

(57) ABSTRACT

Embodiments of an invention interrupts between virtual machines are disclosed. In an embodiment, a processor includes an instruction unit and an execution unit, both implemented at least partially in hardware of the processor. The instruction unit is to receive an instruction to send an interrupt to a target virtual machine. The execution unit is to execute the instruction on a sending virtual machine without exiting the sending virtual machine. Execution of the instruction includes using a handle specified by the instruction to find a posted interrupt descriptor.

20 Claims, 5 Drawing Sheets

(56) References Cited

U.S. PATENT DOCUMENTS

| | | | |
|---|---|---|---|
| 2014/0082240 A1* | 3/2014 | Coleman | G06F 9/4812 710/260 |
| 2014/0173169 A1* | 6/2014 | Liu | G06F 12/1009 711/6 |
| 2015/0026678 A1 | 1/2015 | Imada et al. | |
| 2015/0058847 A1 | 2/2015 | Zheng et al. | |
| 2015/0301947 A1 | 10/2015 | Liu et al. | |

OTHER PUBLICATIONS

International Search Report and Written Opinion for Application No. PCT/US2016/067849, dated Mar. 24, 2017, 13 pages.
International Preliminary Report on Patentability for Application No. PCT/US2016/067849, dated Jul. 26, 2018, 12 pages.

\* cited by examiner

Posted-Interrupt Descriptor 400

METHOD 500

INTERRUPTS BETWEEN VIRTUAL MACHINES

BACKGROUND

1. Field

The present disclosure pertains to the field of information processing, and more particularly, to the field of virtualization in information processing systems.

2. Description of Related Art

Generally, the concept of virtualization in information processing systems allows multiple instances of one or more operating systems (each, an OS) to run on a single information processing system, even though each OS is designed to have complete, direct control over the system and its resources. Virtualization is typically implemented by using software (e.g., a virtual machine monitor (VMM) or hypervisor) to present to each OS a virtual machine (VM) having virtual resources, including one or more virtual processors, that the OS may completely and directly control, while the VMM maintains a system environment for implementing virtualization policies such as sharing and/or allocating the physical resources among the VMs (the virtual environment).

BRIEF DESCRIPTION OF THE FIGURES

The present invention is illustrated by way of example and not limitation in the accompanying figures.

DETAILED DESCRIPTION

Figure 1:
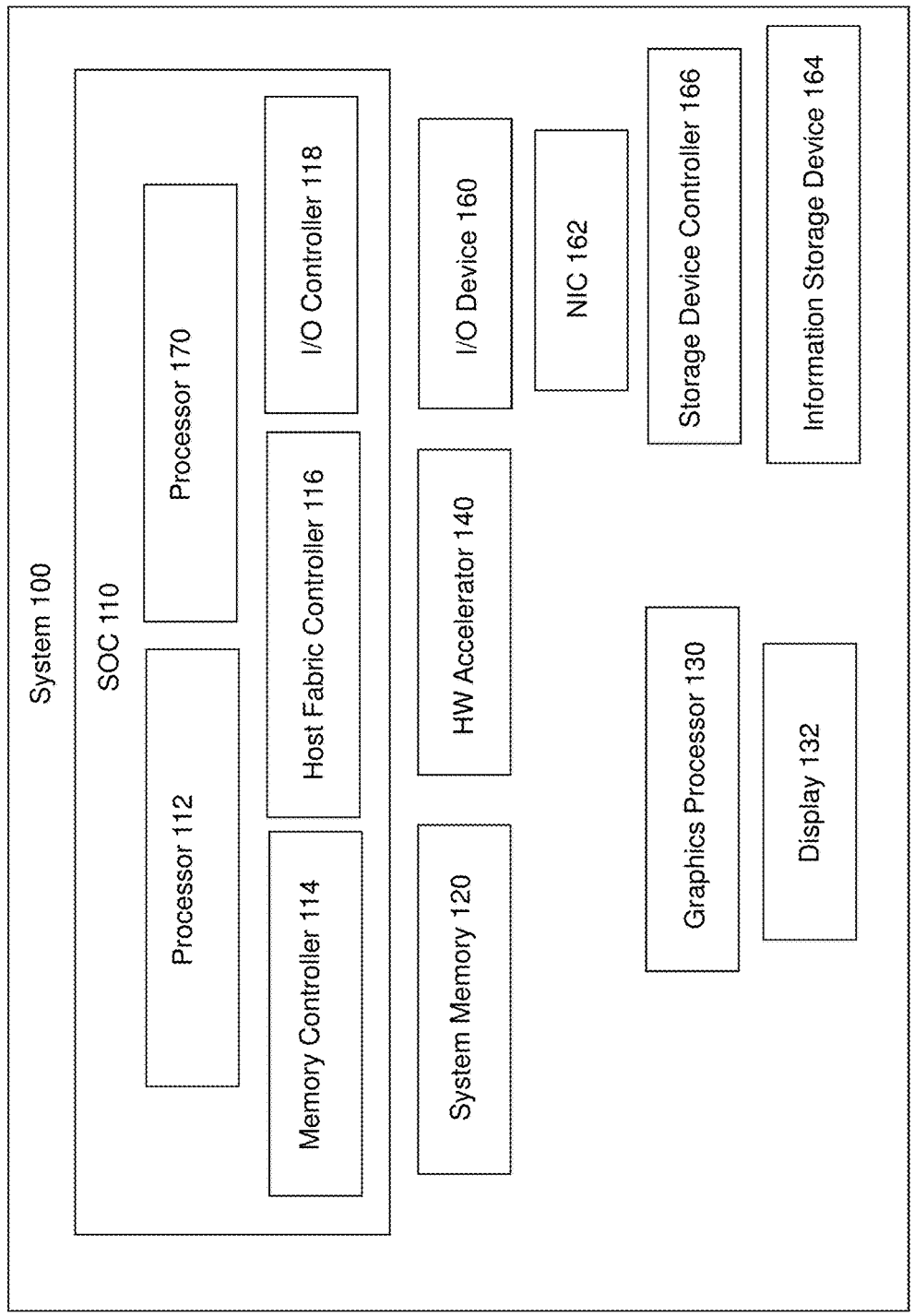
FIG. 1 illustrates an information processing system in which an embodiment of the present invention may provide for interrupts between virtual machines.

Embodiments of an invention for interrupts between virtual machines are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or of or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the present invention, a "/" character between terms may mean that an embodiment may include or be implemented using, with, and/or according to the first term and/or the second term (and/or any other additional terms).

As described in the background section, information processing systems may provide support for virtualization, including the creation of multiple VMs. Communication between VMs may involve a first VM sending a notification or interrupt to a second VM (any such notification or interrupt may be referred to as an inter-VM interrupt, inter-VM inter-processor interrupt, or inter-VM-IPI). The use of embodiments of the present invention to increase the efficiency of inter-VM interrupts, by eliminating VM exits, may be desired. Embodiments of the present invention may be practiced using a processor having an instruction set architecture (ISA) including instructions to support virtualization, which may be part of a set of virtualization extensions to any existing ISA, or according to a variety of other approaches.

FIG. 1 illustrates system 100, an information processing system including an embodiment of the present invention for inter-VM interrupts. System 100 may represent any type of information processing system, such as a server, a desktop computer, a portable computer, a set-top box, a hand-held device such as a tablet or a smart phone, or an embedded control system. System 100 includes processor 112, memory controller 114, host fabric controller 116, I/O controller 118, system memory 120, graphics processor 130, and hardware accelerator 140.

Systems embodying the present invention may include any number of each of these components and any other components or other elements, such as peripherals and/or I/O devices (e.g., as described below). Any or all of the components or other elements in this or any system embodiment may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package, such as SOC 110.

Figure 2:
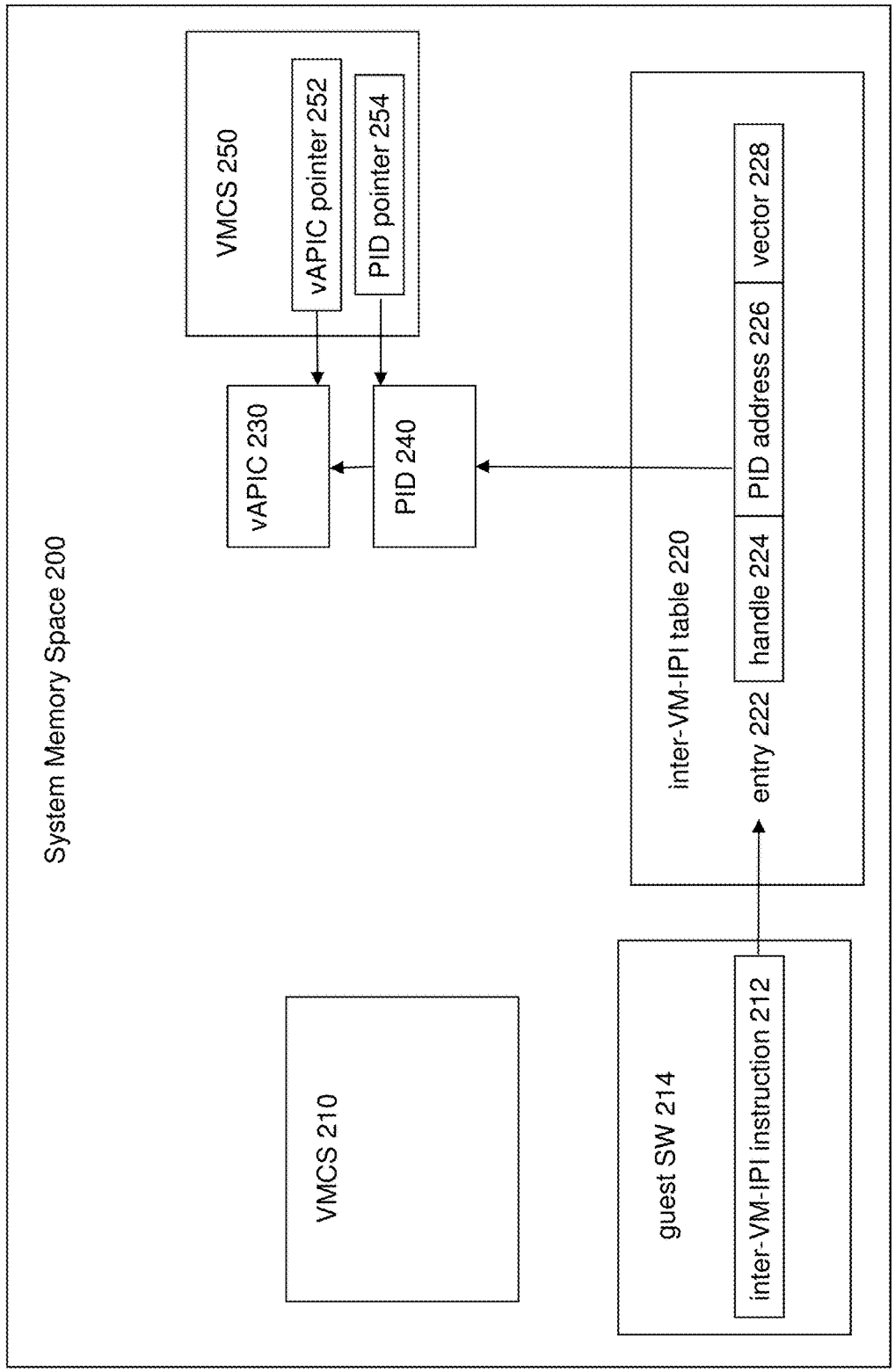
FIG. 2 illustrates a system memory space according to an embodiment of the present invention.

System memory 120 may be dynamic random access memory (DRAM) or any other type of medium readable by processor 112. System memory 120 may be used to provide a physical memory space from which to abstract a system memory space for system 100, such as system memory space 200 illustrated in FIG. 2. The content of system memory space 200, at various times during the operation of system 100, may include various combinations of data, instructions, code, programs, software, and/or other information stored in system memory 120 and/or moved from, moved to, copied from, copied to, and/or otherwise stored in various memories, storage devices, and/or other storage locations (e.g., processor caches and registers) in system 100.

System memory space 200 may be logically organized, addressable as, and/or otherwise partitioned (e.g., using any known memory management, virtualization, partitioning, and or other techniques) into regions of one or more sizes. In various embodiments, such regions may be 4K-byte pages, so, for convenience, such regions may be referred to in this description as pages; however, the use of the term "page" in this description may mean any size region of memory.

In various embodiments of the present invention, system memory space 200 may contain VM control structure (VMCS) 210 corresponding to a sending VM, inter-VM-IPI instruction 212 in guest software 214 to be executed by the sending VM, inter-VM-IPI table 220 (including entry 222 having handle field 224, posted-interrupt descriptor (PID) address field 226, and vector field 228), virtual local Advanced Programmable Interrupt Controller (APIC) page 230, PID 240, and VMCS 250 (including virtual local APIC (vAPIC) pointer 252 and PID pointer 254) corresponding to a target VM, all of which are defined and/or described below.

Memory controller 114 may represent any circuitry or component for accessing, maintaining, and/or otherwise controlling system memory 120. Host fabric controller 116 may represent any circuitry or component for controlling an interconnect network or fabric through which processors and/or other system components may communicate. Graphics processor 130 may include any processor or other component for processing graphics data for display 132. Hardware accelerator 140 may represent any cryptographic, compression, or other accelerator to which a processor may offload functionality such as the hardware acceleration of encryption or compression algorithms.

I/O controller 118 may represent any circuitry or component, such as a chipset component, including or through which peripheral, input/output (I/O), or other components or devices, such as I/O device 160 (e.g., a touchscreen, keyboard, microphone, speaker, other audio device, camera, video or other media device, motion or other sensor, receiver for global positioning or other information, etc.), network interface controller (NIC) 162, and/or information storage device 164, may be connected or coupled to processor 112. Information storage device 164 may represent any one or more components including any one more types of persistent or non-volatile memory or storage, such as a flash memory and/or a solid state, magnetic, or optical disk drive, and may include its own information storage device controller 166.

Processor 112 may represent all or part of a hardware component including one or more processors or processor cores integrated on a single substrate or packaged within a single package, each of which may include multiple execution threads and/or multiple execution cores, in any combination. Each processor represented as or in processor 112 may be any type of processor, including a general purpose microprocessor, such as a processor in the Intel® Core® Processor Family or other processor family from Intel® Corporation or another company, a special purpose processor or microcontroller, or any other device or component in an information processing system in which an embodiment of the present invention may be implemented. Processor 112 may be architected and designed to operate according to any ISA.

System 100 and/or SOC 110 may include one or more additional processors or processor cores (one of which is represented as processor 170), each or any of which may be any type of processor or processor core, including a processor or processor core identical to, compatible with, in the same family as, sharing any portion of the same ISA with, and/or differing in any way from processor 112.

Figure 3:
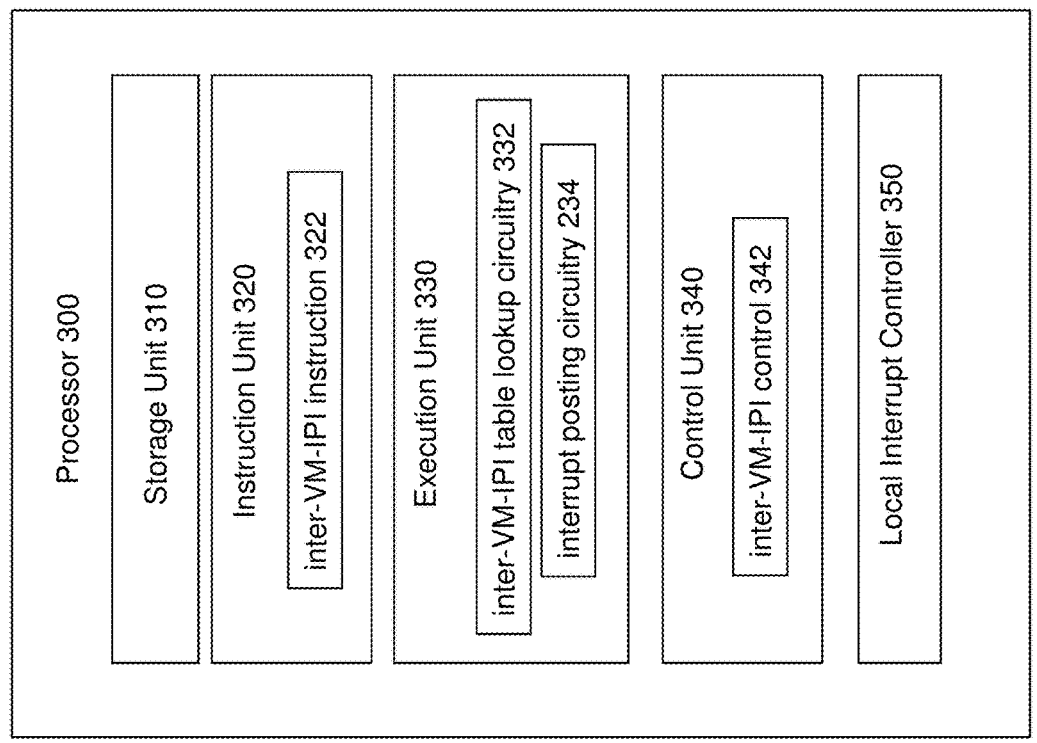
FIG. 3 illustrates a processor including support for interrupts between virtual machines according to an embodiment of the present invention.

FIG. 3 illustrates processor 300, which may represent an embodiment of processor 112 and/or processor 170 in FIG. 1 or an execution core of a multicore processor embodiment of processor 112 and/or processor 170 in FIG. 1. Processor 300 may include storage unit 310, instruction unit 320, execution unit 330, control unit 340, and local interrupt controller 350. Processor 300 may also include any other circuitry, structures, or logic not shown in FIG. 3.

Storage unit 310 may include any combination of any type of storage usable for any purpose within processor 300; for example, it may include any number of readable, writable, and/or read-writable registers, buffers, and/or caches, implemented using any memory or storage technology, in which to store capability information, configuration information, control information, status information, performance information, instructions, data, and any other information usable in the operation of processor 300, as well as circuitry usable to access such storage and/or to cause or support various operations and/or configurations associated with access to such storage.

Instruction unit 320 may include any circuitry, logic, structures, and/or other hardware, such as an instruction decoder, to fetch, receive, decode, interpret, schedule, and/or handle instructions (including inter-VM-IPI instruction 322, described below) to be executed by processor 300. Any instruction format may be used within the scope of the present invention; for example, an instruction may include an opcode and one or more operands, where the opcode may be decoded into one or more micro-instructions or micro-operations for execution by execution unit 330. Operands or other parameters may be associated with an instruction implicitly, directly, indirectly, or according to any other approach.

Execution unit 330 may include any circuitry, logic, structures, and/or other hardware, such as arithmetic units, logic units, floating point units, shifters, etc., to process data and execute instructions, micro-instructions, and/or micro-operations. Execution unit 330 may represent any one or more physically or logically distinct execution units. Execution unit 330 may include inter-VM-IPI table lookup circuitry 332 to use a handle from an inter-VM-IPI instruction to find a PID address and an interrupt vector in an inter-VM-IPI table, as described below. Execution unit 330 may also include interrupt posting circuitry 334 to post an interrupt, as described below.

Control unit 340 may include any microcode, firmware, circuitry, logic, structures, and/or hardware to control the operation of the units and other elements of processor 300 (including inter-VM-IPI control 342) and the transfer of data within, into, and out of processor 300. Control unit 340 may cause processor 300 to perform or participate in the performance of method embodiments of the present invention, such as the method embodiments described below, for example, by causing processor 300, using execution unit 330 and/or any other resources, to execute instructions received by instruction unit 320 and micro-instructions or micro-operations derived from instructions received by instruction unit 320. The execution of instructions by execution 330 may vary based on control and/or configuration information stored in storage unit 310.

Local interrupt controller 350 may include any circuitry, logic, structures, and/or other hardware to receive, generate, prioritize, deliver, hold pending, or otherwise control or manage interrupt requests. For example, local interrupt controller 350 may be a local APIC in a processor in the Core® Processor Family from Intel Corporation. Embodiments of the present invention may include virtualization of local interrupt controller 350, according to any known approach, to provide a virtual local interrupt controller for each virtual processor abstracted from processor 300.

Processor 300 may support virtualization according to any approach. For example, processor 300 may operate in two modes—a first (root) mode in which software runs directly on the hardware, outside of any virtualization environment, and a second (non-root) mode in which software runs at its intended privilege level, but within a virtual environment hosted by a VMM running in the first mode. In the virtual environment, certain events, operations, and situations, such as interrupts, exceptions, and attempts to access privileged registers or resources, may be intercepted, i.e., cause the processor to exit the virtual environment (a VM exit) so that the VMM may operate, for example, to implement virtualization policies. The processor may support instructions for establishing, entering (a VM entry), exiting, and maintaining a virtual environment, and may include register bits or other structures that indicate or control virtualization capabilities of the processor.

In describing embodiments of the present invention, any platform, system, or machine, including the "bare metal" platform shown as system 100 in FIG. 1 as well as any VM or other container abstracted from a bare metal platform, from which one or more VMs may be abstracted may be referred to as a host or host machine, and each VM abstracted from a host machine may be referred to as a guest or guest machine. Accordingly, the term "host software" may mean any hypervisor, VMM, OS, or any other software that may run, execute, or otherwise operate on a host machine and create, maintain, and/or otherwise manage one or more VMs, and the term "guest software" may mean any OS, system, application, user, or other software that may run, execute, or otherwise operate on a guest machine. Note that in a layered container architecture, software may be both host software and guest software. For example, a first VMM running on a bare metal platform may create a first VM, in which a second VMM may run and create a second VM abstracted from the first VM, in which the case the second VMM is both host software and guest software.

Processor 300 may control the operation of one or more VMs according to data stored in one or more VMCSs. A VMCS is a data structure that may contain state of one or more guests, state of a host, execution control information indicating how a VMM is to control operation of a guest or guests, execution control information indicating how VM exits and VM entries are to operate, information regarding VM exits and VM entries, and any other such information. Processor 300 may read information from a VMCS to determine the execution environment of a VM and constrain its behavior. Embodiments may use one VMCS per VM or any other arrangement. Each VMCS may be stored, in whole or in part, in system memory 120, and/or elsewhere, such as being copied to a cache memory of a processor.

According to embodiments of the present invention, a VMCS (e.g., VMCS 250) may include a first pointer (e.g., vAPIC pointer 252) to a first data structure (e.g., virtual local APIC page 230) to be used in the virtualization of a local interrupt controller (e.g., local interrupt controller 350) and a second pointer (e.g., PID pointer 254) to a second data structure (e.g., PID 240) to be used in the posting of interrupts to a virtual processor. Virtualization of a local interrupt controller and posting of interrupts to a virtual processor may each be implemented according to any known approach, such that the resources of each VM may include one or more virtual processors, each with a corresponding virtual local interrupt controller, such that interrupts may be sent to each VM abstracted from system 100.

From within a VM, it may be desirable for guest software running in the VM (to be referred to as a sending VM) to send a notification or interrupt to a different VM, virtual processor, virtual device, or other target (any of which, for convenience but without limitation, may be referred to as a target VM). An attempt to send a notification or interrupt from a sending VM to a target VM may (e.g., based on controls set in a VMCS) cause a VM exit, which may provide for a VMM, hypervisor, or other host software (each of which may be referred to as a VMM for convenience) to intercept, assist with, and/or perform the sending of the notification/interrupt. To avoid the overhead of the VM exit involved in this scenario, embodiments of the present invention provide for an instruction (inter-VM-IPI) to be used by a guest running in a sending VM to allow a notification/interrupt (an inter-VM interrupt) to be sent to a target VM without causing a VM exit from the sending VM or other transfer of control to a VMM or out of non-root mode.

Note that the name of the inter-VM-IPI instruction and the VMFUNC instruction referred to below are provided merely for convenience, and embodiments of the present invention may include such an instructions having any names desired. In various embodiments, one or more variants of these instructions may be added to an existing ISA as enhancements, extensions, leaves, or other variants of one or more existing instructions or opcodes. Also note that a processor's execution of and/or response to an inter-VM-IPI instruction may also or instead be performed (and/or possibly referred to below as an inter-VM-IPI operation or function) in response to or in connection with other events (e.g., a write to or setting of bits of a command, model-specific, or other register).

In various embodiments of the present invention, an inter-VM-IPI instruction may be a leaf of the VMFUNC instruction or opcode that allows functions provided to support virtualization to be called from within a VM, without causing a VM exit. A first parameter associated with the VMFUNC instruction (e.g., the value in the EAX register in a processor in the Intel® Core® Processor Family) may specify that the function to be invoked is an inter-VM-IPI function (for example, the value of '1' in the EAX register may specify the inter-VM-IPI function, which may therefore be referred to as VMFUNC(1)). A second parameter associated with the VMFUNC instruction (e.g., the value in the ECX register in a processor in the Intel® Core® Processor Family) may be used as a handle to specify the target VM, as further described below. If the specified handle is invalid or does not exist, the VMFUNC(1) instruction may result in a VM exit, a virtualization exception (without a VM exit), or another known error handling approach.

The virtualization functionality and support described above may be subject to any number and/or level of enablement controls. In an embodiment, a global virtualization control, (e.g., a designated bit in a designated control register in storage unit 310) may be used to enable or disable the use of non-root mode. A secondary controls activation control (e.g., a designated bit in a designated VM-execution control field of the VMCS) may be used to enable a secondary level of controls for execution in non-root mode. The secondary controls may include a VM function enable control (e.g., a designated bit in a designated VM-execution control field of the VMCS) that may be used to enable the use of the VMFUNC instruction. A VMFUNC(1) control (e.g., a designated bit in a designated VM-function control field of the VMCS) may be used to enable the use of inter-VM-IPIs. Note that in this embodiment, the use of inter-VM-IPIs is not enabled unless all of the bits described above are set.

Furthermore, note that processor 200 may be designed, configured, and/or programmed such that the VMFUNC instruction, a particular leaf of the VMFUNC instruction (e.g., leaf 1), and/or the inter-VM-IPI instruction may be executable from one or more privilege levels. For example, processor 200 and/or a particular VM may be configured (e.g., by a VMM) to allow an inter-VM-IPI instruction to be executed, without causing a VM exit, from within a supervisor mode supported by the processor (e.g., ring-0) and a user mode supported by the processor (e.g., ring-3).

In embodiments of the present invention, the value of the handle specified by an inter-VM-IPI instruction may be used to find the desired target VM and other information to be used to send the notification/interrupt to the target VM. In an embodiment, the notification/interrupt may be sent according to a posted-interrupt approach by using a table (e.g. inter-VM-IPI table 220) or other data structure stored or to be stored in system memory 120. An inter-VM-IPI table may have any number of entries, with each entry having a format including a handle field (e.g., handle field 224), a PID address field (e.g., PID address field 226), and a vector field (e.g., vector field 228), each field of any size.

For example, handle field 224 may include 16 bits to store a handle value to be used to as an entry number, address, index, pointer, or other locator of or to a particular entry in the table such that a handle value specified by an inter-VM-IPI instruction may be used by inter-VM-IPI lookup circuitry 332 to find the desired entry in the table. PID address field 226 may include 58 bits to store an address of a PID (e.g., PID 240), such that a PID to be used to post an interrupt to a target VM may be found. Vector field 228 may include 8 bits to store a virtual interrupt vector corresponding to the particular notification and/or interrupt to be sent to the target VM.

Posting of an inter-VM interrupt may be performed according to any known approach, including an approach using a PID. In an embodiment of the present invention, a PID may be the size of a line of a cache accessible to processor 300, and the address may be aligned to a cache line. For example, a PID may be 64 bytes, with an address having all zeroes in the six least significant bits, therefore PID address field 226 may be used to store bits 63:6 of an address in the address space of processor 300.

Figure 4:
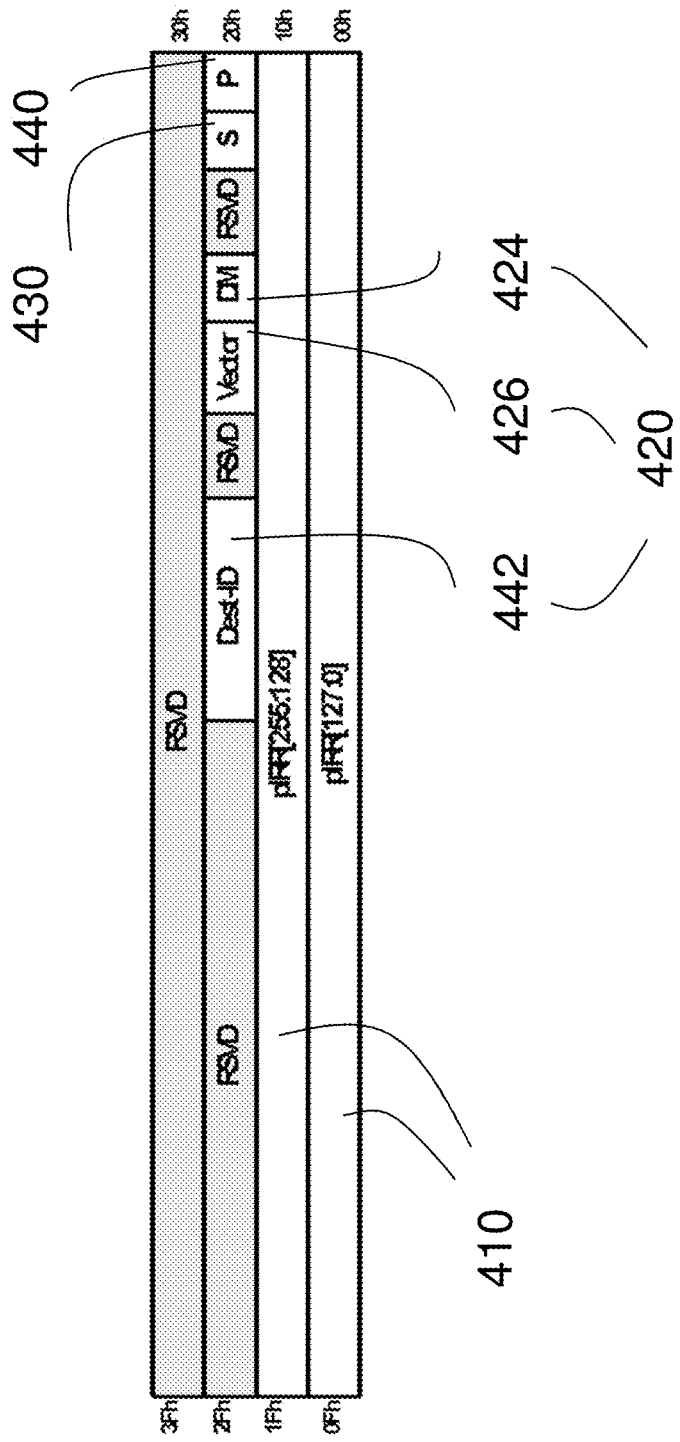
FIG. 4 illustrates a posted-interrupt descriptor format according to an embodiment of the present invention.

Software, such as a VMM, may allocate a PID for each virtual processor that may be the target of an inter-VM-IPI. Each PID may have a format 400 as illustrated in FIG. 4, including fields 410, 420, 430, and 440.

Field 410 may include the lowest 32 bytes of a 64-byte PID to form a 256-bit posted interrupt request register (pIRR). Each bit of the pIRR may correspond to one of 256 virtual interrupt vectors for the virtual processor corresponding to the PID. Each bit of the pIRR may be set to post an interrupt request for a corresponding virtual interrupt vector (e.g., the virtual interrupt vector specified by vector field 228).

Field 420 may include three sub-fields 442, 424, and 426 to indicate attributes of a notify event to be used to inform a VMM of pending posted interrupts. In an embodiment, the event used to notify a VMM that posted interrupts are pending may be a physical interrupt request to a physical processor. Therefore, using a physical processor that may support over one hundred physical interrupts, embodiments of the present invention may provide for over one hundred virtual processors per physical processor.

Sub-field 442 (Dest-ID) may include 32 bits to identify the destination of the interrupt request, which, for example, may be the local APIC for the physical processor on which the virtual processor that is the target of the interrupt request is running. The physical processor to which the target virtual processor has temporal affinity may change as virtual processors are migrated, so this field may be reprogrammed, by the VMM, with a new local APIC identifier in connection with a migration for load balancing or any other reason. The physical processor to which a target virtual processor has temporal affinity at any given time may be called the "notify-processor" in this description, as it will be the physical processor to which a notify event will be sent when there are pending posted-interrupts for that virtual processor. Sub-field 424 (DM) may include a single bit to indicate the mode for the notify event. For example, in an embodiment where the notify event is a physical interrupt, DM may indicate whether the value of Dest-ID should be interpreted as a physical or a logical identifier. Sub-field 426 (Physical Vector) may include eight bits to indicate the physical vector to be used for the notify event. When a notify event is delivered to the VMM, the VMM may use the physical vector to determine which virtual processor has pending posted interrupts in its PID. Therefore, embodiments of the present invention provide for a single physical vector per virtual processor, instead of a physical vector for each virtual interrupt.

Sub-field 424 (DM) may include a single bit to indicate the mode for the notify event. For example, in an embodiment where the notify event is a physical interrupt, DM may indicate whether the value of Dest-ID should be interpreted as a physical or a logical identifier. Sub-field 426 (Physical Vector) may include eight bits to indicate the physical vector to be used for the notify event. When a notify event is delivered to the VMM, the VMM may use the physical vector to determine which virtual processor has pending posted interrupts in its PID. Therefore, embodiments of the present invention provide for a single physical vector per virtual processor, instead of a physical vector for each virtual interrupt.

Field 430 (Suppress or S) may include one bit to store a suppress flag to indicate whether notify events are to be suppressed when posting interrupts to this PID. Software, such as a VMM, may set this bit at any time to suppress notify events, such as when the corresponding virtual processor is not running because it is in the scheduler wait queue, waiting for one of its quanta of time to run. Field 440 (Pending or P) may include one bit to store a pending flag to indicate whether there is a pending notify event for this PID that has not been serviced yet. If this flag is already set at the time an interrupt request is posted, then there is no need to send another notify event. This flag may be set by hardware when it sends a notify event, and cleared by software as part of servicing the notify event.

Figure 5:
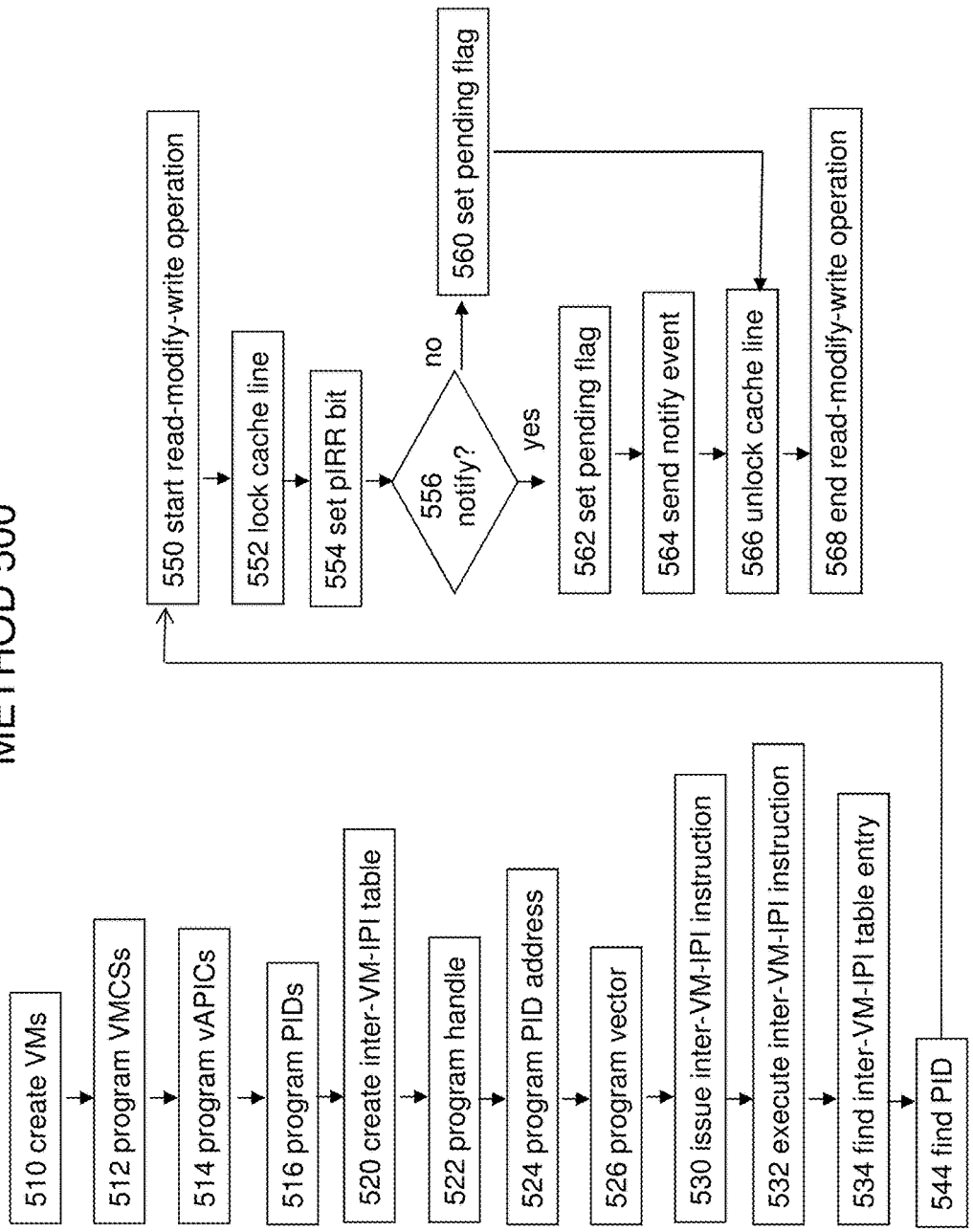
FIG. 5 illustrates a method for interrupts between virtual machines according to an embodiment of the present invention.

FIG. 5 illustrates method 500 for sending an inter-VM-IPI from a first VM to a second VM according to an embodiment of the present invention. Although method embodiments of the invention are not limited in this respect, reference may be made to elements of FIGS. 1, 2, 3, and 4 to help describe the method embodiment of FIG. 5. Various portions of method 500 may be performed by hardware, firmware, software, and/or a user of a system such as system 100.

In box 510 of method 500, a VMM may create one or more VMs (including a first VM and a second VM) on an information processing system (e.g., system 100). Any such VM may include one or more virtual processors, where each virtual processor may be abstracted from a physical processor or physical processor core in system 100. Embodiments of the present invention provide for an inter-VM-IPI to be sent from guest software being executed by a first virtual processor in any VM (e.g., the first VM) to a second virtual processor in any other VM (e.g., the second VM) regardless of whether the first virtual processor and the second virtual processor are abstracted from the same physical processor or physical processor core or from two physical processors or physical processor cores in/on the same or different integrated circuits, die, chips, substrates, or packages. Furthermore, embodiments of the present invention may include posting of interrupts to virtual interrupt controllers such that any such VM, virtual processor, and/or physical processor may be involved in activity, power, and/or other state transitions and/or migrations without losing or re-sending any pending inter-VM-IPIs.

Creation of VMs may include, in boxes 512, 514, and 516 creation, configuration, and/or programming of a VMCS, a vAPIC page, and a PID, respectively, for each VM.

In box 520, an inter-VM-IPI table (e.g., inter-VM-IPI table 220) may be created (e.g., by a VMM). In box 522, a particular handle value may be stored (e.g., by a VMM) in a handle field (e.g., handle field 224) of a particular entry in the inter-VM-IPI table. In box 524, a particular PID address value corresponding to the particular handle value may be stored (e.g., by a VMM) in a PID address field (e.g., PID address field 226) of the particular entry. In box 526, a particular virtual interrupt vector value corresponding to the particular handle value may be stored (e.g., by a VMM) in a vector field (e.g., vector field 226) of the particular entry. The particular PID address value and the particular virtual interrupt vector value may be chosen to provide for an inter-VM-IPI instruction specifying the particular handle value to post a particular interrupt to a particular virtual processor.

In box 530, a particular instance of an inter-VM-IPI instruction (e.g., inter-VM-IPI instruction 212) specifying the particular handle value may be issued by guest software running in the first VM. In box 532, the particular instance of the inter-VM-IPI instruction may be executed by a first virtual processor in the first VM. Execution of the particular instance of the inter-VM-IPI instruction may include, in box 534, finding (e.g., by inter-VM-IPI lookup circuitry 332) the particular entry in the inter-VM-IPI table.

In box 544, the PID address from the particular entry in the inter-VM-IPI table is used (e.g., by interrupt posting circuitry 334) to find the particular PID (e.g., PID 240) to be used for the particular handle.

In box 550, a read-modify-write operation is initiated (e.g., by interrupt posting circuitry 334) to PID 240. An atomic read-modify-write operation is used to allow access to the PID by multiple sources, such as multiple instances of interrupt circuitry 334 in processors, other interrupt posting hardware, and/or software such as a VMM. In box 552, the cache line storing the PID is locked. In box 554, the pIRR bit corresponding to the virtual interrupt vector from the particular entry is set (or, if already set, it remains set).

In box 556, it is determined whether to generate a notify event. In one embodiment, the determination is based on the values the Pending and Suppress bits in the PID, as follows. If the Suppress flag is not set (i.e., the VMM has not temporarily suppressed interrupt requests to this virtual processor) and the Pending bit is not set (i.e., there is not already a notify event pending for this virtual processor), it is determined that a notify event is to be sent, so method 500 continues to box 562. Otherwise, no notify event is to be sent, so method 500 continues to box 560.

In boxes 560 and 562, the Pending flag in this PID is set. From box 560, method 500 continues to box 566, skipping the sending of a notify event.

From box 562, method 500 continues to box 564, in which a notify event is sent to the destination specified by the Dest-ID and DM fields of this PID, using the value in the Physical Vector field. For example, an interrupt message may be sent to the local APIC specified by the Dest-ID and DM fields, the interrupt message including the vector from the Physical Vector field.

In box 566, the cache line is unlocked. In box 568, the atomic read-modify-write operation, begun in box 550, ends.

Note that boxes 532 through 568, inclusive, are performed by hardware and/or control logic embedded in a processor in response to the processor receiving an inter-VM-IPI instruction from guest software running on a VM, without causing a VM exit and without transferring control of the processor to or otherwise invoking a VMM.

Therefore, a sending VM may send a notification/interrupt to a target VM without a VM exit and without invoking a VMM. The delivery and/or injection of the notification/interrupt to/into the target VM may be performed according to any known approach. For example, the notify-processor for the target processor in the target VM may, in response to a notify event, send an IPI by writing to the Interrupt Command Register of the corresponding vAPIC page (e.g., vAPIC page 23) with a vector corresponding to an inter-VM-IPI. If the target VM is active, the notification/interrupt may be delivered directly to the target VM (without a VM exit or invoking VMM) and without invoking a VMM. If the target VM is scheduled, the notification/interrupt may be posted (without a VM exit or invoking VMM). If delivery of interrupts to the target VM is blocked, the interrupt may be delivered by a VMM.

In various embodiments of the present invention, the method illustrated in FIG. 5 may be performed in a different order, with illustrated boxes combined or omitted, with additional boxes added, or with a combination of reordered, combined, omitted, or additional boxes. Furthermore, method embodiments of the present invention are not limited to method 500 or variations thereof. Many other method embodiments (as well as apparatus, system, and other embodiments) not described herein are possible within the scope of the present invention. For example, errors in the execution of an inter-VM-IPI instruction and/or in connection with an inter-VM-IPI operation may cause a VM exit, a virtualization exception (without a VM exit), or be handling according to any other known approach.

Embodiments or portions of embodiments of the present invention, as described above, may be stored on any form of a machine-readable medium. For example, all or part of method 500 may be embodied in software or firmware instructions that are stored on a medium readable by a processor, which when executed by a processor, cause the processor to execute an embodiment of the present invention. Also, aspects of the present invention may be embodied in data stored on a machine-readable medium, where the data represents a design or other information usable to fabricate all or part of a processor or other component.

Thus, embodiments of an invention for interrupts between virtual machines have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   an instruction decoder to decode an instruction set of the processor, the instruction set including a first instruction responsive to which the processor is to send an interrupt from a sending virtual machine to a target virtual machine, the first instruction to be issued by guest software running in the sending virtual machine, the first instruction having a parameter to be used as a handle to specify the target virtual machine; and
   execution circuitry to execute the first instruction on the sending virtual machine without exiting the sending virtual machine, execution of the instruction to include using the handle to find a posted interrupt descriptor to be used to post the interrupt to the target virtual machine.

2. The processor of claim 1, wherein using the handle includes using the handle to find an entry in a data structure, the entry having a first field in which to store an address of the posted interrupt descriptor.

3. The processor of claim 2, the entry also having a second field in which to store an interrupt vector corresponding to the interrupt to be sent to the target virtual machine.

4. The processor of claim 2, wherein the execution circuitry includes lookup circuitry to find the entry.

5. The processor of claim 4, wherein the execution circuitry also includes interrupt posting circuitry to post the interrupt to the posted interrupt descriptor.

6. The processor of claim 1, wherein the first instruction is a leaf of a second instruction, the second instruction to provide for a function to be performed on a virtual machine without transferring control of the processor to a virtual machine monitor.

7. A method comprising:
   decoding, by an instruction decoder of a processor, an instruction from guest software running on a sending virtual machine to send an interrupt to a target virtual machine, the instruction having a parameter to be used as a handle to specify the target virtual machine; and
   executing, by execution circuitry of the processor without exiting the virtual machine, the instruction, including using the handle to find a posted interrupt descriptor to be used to post the interrupt to the target virtual machine.

8. The method of claim 7, wherein using the handle includes using the handle to find an entry in a data structure, the entry having a first field in which to store an address of the posted interrupt descriptor.

9. The method of claim 8, the entry also having a second field in which to store an interrupt vector corresponding to the interrupt to be sent to the target virtual machine.

10. The method of claim 9, further comprising using the posted interrupt descriptor to find a virtual interrupt controller to deliver the interrupt to the target virtual machine.

11. The method of claim 10, further comprising delivering the interrupt directly, without exiting the sending virtual machine, to the target virtual machine if the target virtual machine is active.

12. The method of claim 10, further comprising posting the interrupt, without exiting the sending virtual machine, if the target virtual machine is scheduled.

13. The method of claim 10, further comprising invoking a virtual machine monitor if interrupt delivery to the target virtual machine is blocked.

14. A system comprising:
   a system memory in which to store a first virtual machine control structure for a sending virtual machine, a second virtual machine control structure for a target virtual machine, and a posted interrupt descriptor; and
   a first processor including:
      an instruction decoder to decode an instruction set of the first processor, the instruction set including a first instruction responsive to which the processor is to send an interrupt from the sending virtual machine to the target virtual machine, the first instruction to be issued by guest software running in the sending virtual machine, the first instruction having a parameter to be used as a handle to specify the target virtual machine; and
      an execution unit, implemented at least partially in hardware, to execute the first instruction on the sending virtual machine without causing a virtual machine exit, execution of the instruction to include using the handle to find the posted interrupt descriptor to be used to post the interrupt to the target virtual machine.

15. The system of claim 14, wherein using the handle includes using the handle to find an entry in a data structure to be stored in the system memory, the entry having a first field in which to store an address of the posted interrupt descriptor.

16. The system of claim 15, the entry also having a second field in which to store an interrupt vector corresponding to the interrupt to be sent to the target virtual machine.

17. The system of claim 16, wherein the sending virtual machine includes a first virtual processor abstracted from the first processor.

18. The system of claim 17, further comprising a second processor, wherein the target virtual machine includes a second virtual processor abstracted from the second processor.

19. The system of claim 18, further comprising an interrupt controller, wherein the target virtual machine includes a virtual interrupt controller abstracted from the interrupt controller.

20. The system of claim 19, wherein the virtual interrupt controller is to deliver the interrupt to the target virtual machine.

* * * * *